United States Patent
Le Quere

(10) Patent No.: US 9,772,058 B2
(45) Date of Patent: Sep. 26, 2017

(54) SEALED-COUPLING DEVICE WITHOUT A RETENTION AREA

(71) Applicant: Parker Hannifin Manufacturing France SAS, Annemasse (FR)

(72) Inventor: Philippe Le Quere, Betton (FR)

(73) Assignee: Parker Hannifin Manufacturing France SAS, Annemasse (FR)

( * ) Notice: Subject to any disclaimer, the term of this patent is extended or adjusted under 35 U.S.C. 154(b) by 295 days.

(21) Appl. No.: 14/462,877

(22) Filed: Aug. 19, 2014

(65) Prior Publication Data

US 2014/0353967 A1 Dec. 4, 2014

Related U.S. Application Data

(63) Continuation of application No. PCT/EP2013/052591, filed on Feb. 8, 2013.

(30) Foreign Application Priority Data

Feb. 20, 2013 (FR) ...................................... 12 51529

(51) Int. Cl.
*F16L 37/091* (2006.01)

(52) U.S. Cl.
CPC ......... *F16L 37/091* (2013.01); *F16L 37/0915* (2016.05); *F16L 2201/40* (2013.01)

(58) Field of Classification Search
CPC . F16L 37/091; F16L 37/0915; F16L 2201/40; F16L 37/025; F16L 37/05; F16L 37/22
USPC ............... 285/307, 331, 244, 318, 238–243, 285/245–257, 259
See application file for complete search history.

(56) References Cited

U.S. PATENT DOCUMENTS

| | | | | |
|---|---|---|---|---|
| 4,026,581 A | * | 5/1977 | Pasbrig | F16L 37/0985 285/24 |
| 5,090,741 A | * | 2/1992 | Yokomatsu | F16L 33/227 285/101 |
| 5,102,170 A | * | 4/1992 | Inoue | F16L 33/227 285/101 |
| 5,423,578 A | * | 6/1995 | Kanomata | F16L 25/0036 285/315 |
| 5,695,221 A | * | 12/1997 | Sunderhaus | F16L 55/1015 251/149.7 |

(Continued)

FOREIGN PATENT DOCUMENTS

WO    2010-052386    5/2010

OTHER PUBLICATIONS

International Search Report for PCT/EP2013/052591, Mar. 8, 2013.

*Primary Examiner* — James M Hewitt
(74) *Attorney, Agent, or Firm* — Renner, Otto, Boisselle & Sklar, LLP

(57) ABSTRACT

Device for the connection of a duct including a tubular body provided with an axial stop for a cylindrical sleeve that defines a tubular accommodating housing and has an end which delimits an annular inlet to the housing that is radially deformable elastically. The housing includes a maintaining member for maintaining the end of the sleeve in a deformed state, the member being designed to be movable between an active position in which it maintains the end in the deformed state and an inactive position in which it is carried by the duct during the introduction thereof and allows the end to return to its rest state.

12 Claims, 3 Drawing Sheets

(56) References Cited

U.S. PATENT DOCUMENTS

| | | | |
|---|---|---|---|
| 7,695,022 B2 * | 4/2010 | Wells | F16L 55/11 138/89.1 |
| 2004/0262920 A1 * | 12/2004 | Le Quere | F16L 37/091 285/340 |
| 2011/0140417 A1 | 6/2011 | Kluss | |

* cited by examiner

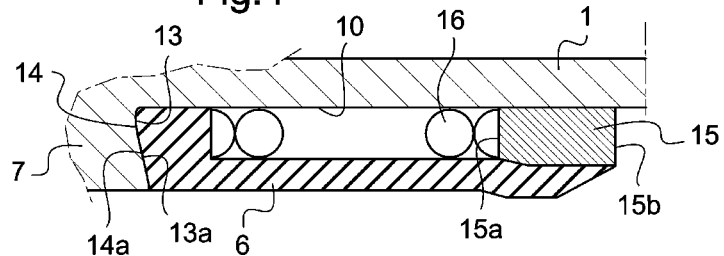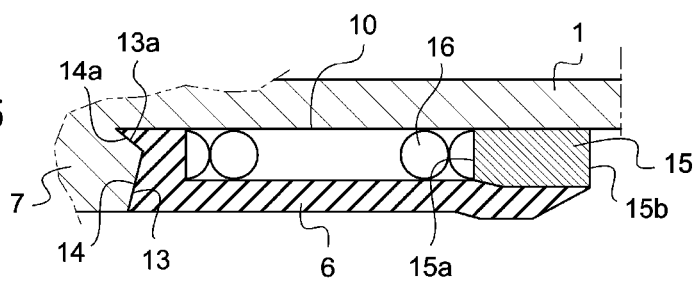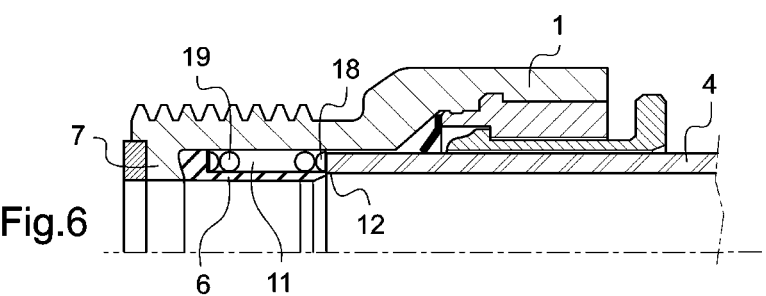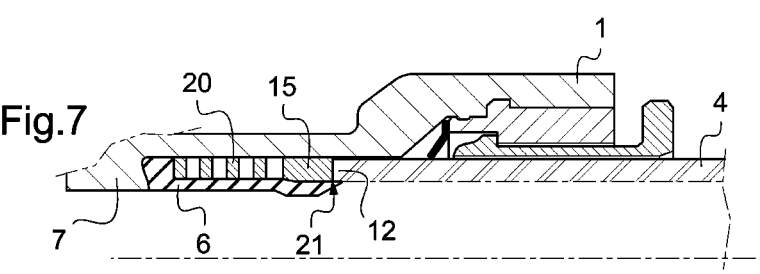

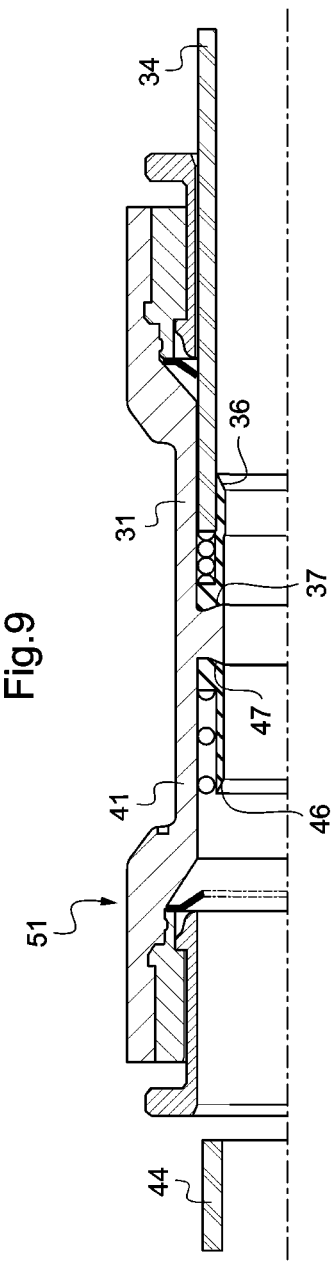

SEALED-COUPLING DEVICE WITHOUT A RETENTION AREA

CROSS-REFERENCE TO RELATED APPLICATIONS

This application is a continuation of International Application No. PCT/EP2013/052591 filed Feb. 8, 2013, which claims priority to French Application No. 1251529 filed Feb. 20, 2012, both of which are incorporated herein by reference in their entirety.

BACKGROUND OF THE INVENTION

The present invention relates to the reduction of liquid retention zones in circuits for transporting liquids such as food liquids. The subject of the invention is more particularly a device for the sealed connection of a duct, having no retention zone into which the liquid could pass and stagnate. Such zones are particularly problematic when the fluid in question is a food liquid or other liquid that is liable to deteriorate under the action of microorganisms since the retention zones are difficult to clean and so the liquid risks remaining trapped there and deteriorating, contaminating the liquid subsequently transported through the circuit. The same problem of contamination arises when a change of liquid is necessary, for example in the case of a change of shade in a paint circuit.

Conventionally found in a device for the sealed connection of a duct is a tubular body that delimits a channel of which an end section is designed to accommodate an end portion of the duct and is provided with an axial stop that limits the insertion of the duct into the tubular body. The end section of the tubular body also receives a toothed washer or a catching gripper of the duct so as to retain the duct in the tubular body. Finally a seal provides a sealed connection of the duct in the tubular body of the connection device.

In a first embodiment, the seal extends into the tubular body in order to grip the duct to be connected. Sealing is thus produced at the external surface of the duct. The quality of sealing is thus dependent on the state of the external surface of the duct which is subjected, before the connection, to external harm such as impacts and friction which is liable to produce scratches and other types of damage. Moreover, this type of mounting brings about retention zones by allowing the liquid to pass between the stop and the annular front face of the duct.

In a second embodiment, the seal adjoins the stop in order to be compressed between the stop and the annular front face of the duct. This limits the retention zones. However, the quality of sealing is dependent on the state of the annular front face of the duct which is generally obtained by means of cutting carried out on site by an operator. This results in scratches on this face, which is otherwise only rarely perfectly perpendicular to the axis of the duct.

According to a third embodiment, the body comprises an internal tubular appendix which is coaxial with the end section of the tubular body and which fits into the interior of the duct during the insertion of the latter into the tubular body. Sealing is thus provided by an O-ring seal disposed in an outer groove provided on the appendix so as to come into contact with the internal surface of the duct, the surface state of which is generally good. This seal is disposed at a distance from the free end of the appendix, creating a retention zone. The connectors having an internal appendix also reduce the flow cross section of the fluid and make an expensive increase in the cross section of the ducts necessary.

It is an aim of the invention to reduce the penetration of liquid circulating in a duct into retention zones.

SUMMARY OF THE INVENTION

To this end, according to the invention, provision is made of a device for the connection of a duct, comprising at least one tubular body provided internally with an axial stop for a tubular sealing sleeve mounted coaxially with the tubular body so as to define a tubular accommodating housing for the duct, the sleeve having an end which delimits an annular inlet to the housing and is radially deformable elastically between a rest state in which the annular inlet has an inside diameter greater than the inside diameter of the duct and a deformed state in which the inside diameter of the annular inlet is such that it allows the duct to be introduced into the housing, said housing comprising a maintaining member for maintaining said end of the sleeve in its deformed state. According to the invention, the maintaining member is designed to be movable between an active position in which it maintains said end in the deformed state and an inactive position in which it is carried by the duct during the introduction thereof and allows said end to return to its rest state.

Thus, a connection device that establishes sealing with the duct by way of an elastic sleeve having a free end pressed against the internal surface of the duct is obtained. This device provides sealing that is unaffected by the surface state of the duct and its cut face.

Advantageously, the device comprises an elastic return member for returning the maintaining member to its active position so as to make the connector removable and reusable.

According to one particular embodiment, the end of the elastic sleeve is bevelled internally so as to avoid any detachment of the latter and to limit turbulence during the passage of the fluid from the duct into the sleeve.

The present invention, accordingly, comprises the construction, combination of elements, and/or arrangement of parts and steps which are exemplified in the detailed disclosure to follow. Further features and advantages of the invention will become apparent on reading the following description of particular non-limiting embodiments of the invention.

BRIEF DESCRIPTION OF THE DRAWINGS

For a fuller understanding of the nature and features of the invention, reference should be had to the following detailed description taken in connection with the accompanying drawings wherein:

FIG. 4 is a detail view in partial section of the embodiment in FIG. 1;

FIG. 5 is a detail view similar to FIG. 4 according to a second embodiment of the invention;

FIG. 6 is a view similar to FIG. 2 of the connection device according to a third embodiment of the connection device according to the invention;

FIG. 7 is a view similar to FIG. 2 of the connection device according to a fourth embodiment of the connection device according to the invention;

FIG. 9 is a schematic half view in partial section of a fifth embodiment of the connection device according to the invention.

Figure 1:
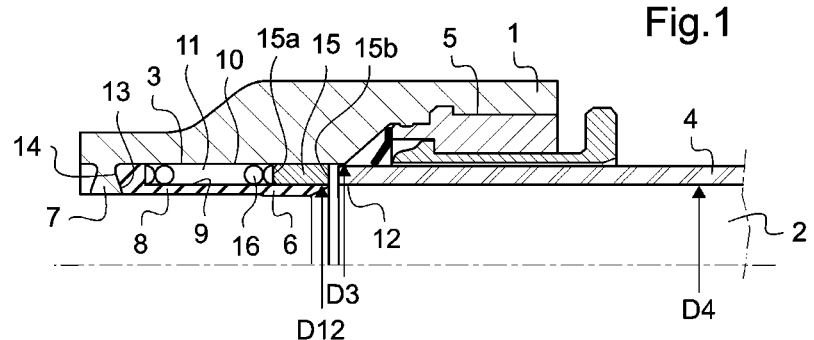
FIG. 1 is a schematic half view in partial section of one particular embodiment of the connection device according to the invention, a duct being presented in order to be connected.
Figure 2:
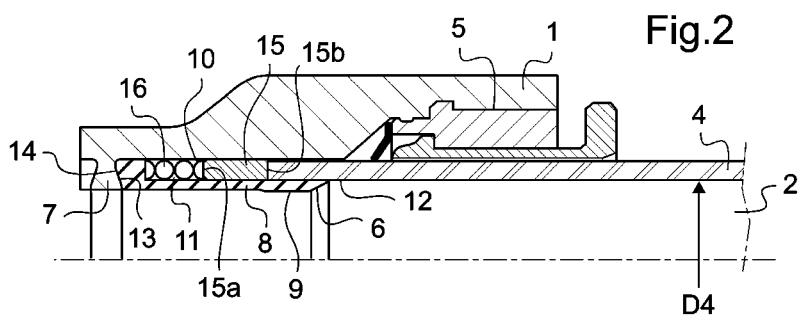
FIG. 2 is a view similar to FIG. 1, the duct being connected to the device.
Figure 3:
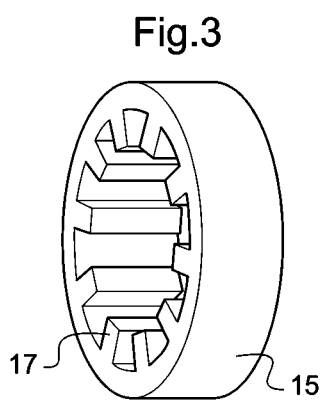
FIG. 3 is a perspective view of a maintaining ring according to the embodiment in FIG. 1.

The drawings will be described further in connection with the following Detailed Description of the Invention

DETAILED DESCRIPTION OF THE INVENTION

With reference to FIGS. 1-4, the connection device in accordance with the invention comprises a tubular body with the general designation 1, delimiting a channel 2 having a section 3 for receiving one end of a duct 4 with an inside diameter D4. Formed in the receiving section 3 is an inlet recess 5 which receives means for securing the end of the duct 4 in the receiving section 3. These means are known per se and comprise in this case an insert of which one end, located at the end of the recess, is joined to an anchoring washer with an inner circumference divided into teeth that are intended to engage with the outer surface of the end of the duct 4. Said end of the insert and the anchoring washer are fitted into a socket which is in abutment with a shoulder of the recess 5 and which is shaped so as to form a stop for the anchoring washer. The insert receives a sliding tubular pusher that has a nose extending in the vicinity of the washer and an operating end projecting out of the body 1 of the connector. The pusher is able to move between an inserted position in which the nose deforms the washer in order to lift the teeth thereof and a retracted position in which the nose is away from the washer. However, other catching means are usable, such as a bolt.

The body 1 comprises a sealing sleeve, with the general designation 6, that is mounted coaxially with the tubular body 1 in the receiving section 3. The receiving section 3 is provided on the inside with a peripheral annular shoulder 7 that forms an axial stop for the sleeve 6.

The sleeve 6 has a tubular shape and comprises an internal surface 8 and an external surface 9. The external surface 9 is opposite an internal wall 10 of the body 1. These two opposing surfaces define a tubular accommodating housing 11 for the duct 4. A first end of the sleeve 6 delimits an annular inlet 12 to the tubular accommodating housing 11. This annular inlet 12 has an inside diameter D12 and an outside diameter D3. It will be noted that the diameter D3 is approximately equal to the outside diameter of the duct 4. The sleeve 6 also comprises an end 13 bearing against a surface 14 of the annular shoulder 7. The end 12 of the sleeve 6 is radially deformable elastically between a rest state in which the annular inlet 12 has an inside diameter D12 greater than the inside diameter D4 of the duct 4 and a deformed state in which the inside diameter D12 of the annular inlet 12 is less than the inside diameter D4 of the duct 4, allowing the latter to be inserted into the tubular housing 11. A cylindrical ring 15 is placed in the annular inlet 12 to the housing 11 and maintains the end 12 of the sleeve 6 in its deformed state. This ring 15 slides axially in the tubular accommodating housing 11, under the effect of a pushing force applied by the end of the duct 4, between an active position in which it maintains the end 12 of the sleeve 6 in its deformed state and an inactive position which allows this end to return to its rest state. That face 15a of the ring 15 that is opposite the face 15b against which the end of the duct 4 pushes is in contact with a first end of a helical spring 16 which is mounted in the tubular accommodating housing 11 and the other end of which bears against the section of the sleeve 6 that is in abutment against the annular shoulder 7. The length of this helical spring 16, when it is not constrained, is such that it carries the ring 15 in such a manner that its face 15b is in the plane of the annular inlet 12.

When a duct 4 is introduced into the body 1 of the device, the duct 4 comes into contact with the face 15b of the ring 15. Since the insertion movement is carried out by the operator, the ring 15 slides in the accommodating housing 11 under the pushing force of the end of the duct 4 against the face 15b and the duct 4 passes into the accommodating housing 11. Without the ring 15, the end of the sleeve 6 delimiting the annular inlet 12 tends to return to its rest state and presses against the internal surface of the duct 4. The elastic pressing force thus obtained provides sealing between the sleeve 6 and the duct 4. The pressure of the liquid circulating in the duct is applied to the internal surface 8 of the sleeve 6 and adds to this elastic pressing force. The cumulative effect of these two forces contributes to the sealing of the connection between the sleeve 6 and the duct 4. A device for the connection of a duct 4 which is sealed as soon as the duct 4 enters its accommodating housing 11, thereby eliminating the problems of infiltration of liquid into a retention zone of the prior art, is thus obtained. The member for maintaining the end of the sleeve 6 in its deformed state, in this case the ring 15, is returned elastically into its position if the duct 4 is extracted. Thus, the connection device is removable and reusable.

According to a preferred embodiment, the ring 15 is provided with internal axial ribs 17 on its inner surface. These internal axial ribs 17 reduce the frictional surface between the internal surface of the ring 15 and the external surface 9 of the sleeve 6, thereby making it easier for the ring 15 to slide relative to the sleeve 6.

According to a particularly advantageous embodiment, the end of the sleeve 6 defining the annular inlet 12 is internally bevelled such that the internal surface of the sleeve 6 is connected gradually to the internal surface of the tube. This arrangement favours the application of said end against the internal surface of the tube under the effect of the pressure and makes it possible to avoid any detachment of the sealing sleeve while limiting turbulence during the passage of the fluid between the duct and the sleeve.

With reference to FIG. 4, the concave surface 14 of the annular shoulder 7 has a frustoconical surface 14a that has a small diameter by the sleeve 6 and engages with a convex surface 13a of the latter. This arrangement maintains the seal in position in its housing, and avoids the latter deforming under the effect of the pressure and moving in the channel 2 (this being known as extrusion of the seal). FIG. 5 shows a variant of an embodiment of the contact surfaces 13 and 14 between the sleeve 6 and the annular shoulder 7. According to this embodiment, the surface 13 of the sleeve 6 is concave and engages with a convex surface 14 of the annular shoulder 7. It will be noted that the force exerted by the end of the duct 4 on the ring 15 presses the surface 13 of the sleeve 6 against the surface 14 of the annular shoulder 7, by reaction of the spring 16 on the end of the sleeve in contact with the annular shoulder 7, thereby helping to seal this contact.

Elements identical or similar to those described above have reference numerals identical thereto in the following description of the third, fourth, fifth and sixth embodiments.

According to a third embodiment that is detailed in FIG. 6, the end of the duct 4 bears directly against contiguous turns 18 of a helical spring 19 leading into the annular inlet 12 to the housing 11. The space delimited by the internal surface of the turns 18 maintains the end of the sleeve 6 in its deformed state. Thus, the member for maintaining the sleeve 6 in its deformed state and its elastic return means are combined into one piece, this being more economical in terms of mounting and manufacturing.

Figure 8:
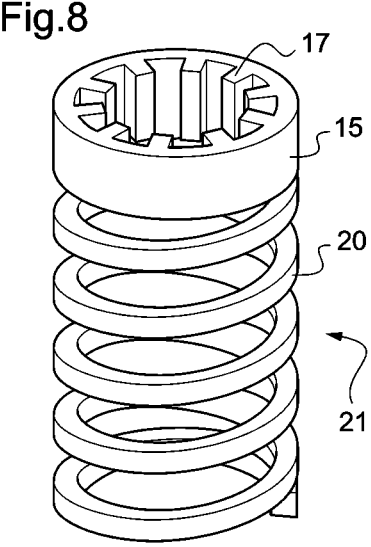
FIG. 8 is a detail view of an element of the connection device according to the embodiment in FIG. 7.

According to a fourth embodiment detailed in FIGS. 7 and 8, the cylindrical ring 15 for maintaining the sleeve 6 in its deformed state is integral with a helical spring 20. This assembly can be realized by moulding a ring provided with a helical cut-out. Thus, the member for maintaining the sleeve 6 in its deformed state and its elastic return are combined into one piece 21, this being more economical in terms of mounting and manufacturing. The ring 15 is provided with axial ribs 17 on its inner face.

According to a fifth embodiment detailed in FIG. 9, the body 51 comprises two tubular bodies 31 and 41 in fluidic communication. This device corresponds to the placing of two devices described in FIG. 6 into fluidic communication. This device makes it possible to produce a rapid sealed joint between two ducts 34 and 44.

The device according to the third, fourth, fifth and sixth embodiments is otherwise identical to the device according to the first embodiment.

Of course, the invention is not limited to the embodiments that have been described but encompasses any variants that are covered by the scope of the invention as defined by the claims. In particular:

although the axial stop for the cylindrical sealing sleeve 6 is in this case a peripheral annular shoulder, the invention is also applicable to other types of stops, for example a plurality of studs projecting from the internal wall of the tubular body of the connection device;

although axial ribs are present on the inner surface of the maintaining ring 15, the invention is also applicable to a ring that does not have ribs or has axial ribs on both of its surfaces or only on its outer surface;

although the device described in FIG. 6 has two tubular bodies in fluidic communication, the invention is also applicable to a device having more than two tubular bodies, for example a union tee having three bodies or a feed header having four or more bodies; and the sealing sleeve may have two concentric annular walls that delimit between one another a housing for accommodating the end of the duct 4 and an element for maintaining in its deformed state the end of the sleeve delimiting the annular inlet to said housing.

All references including any priority documents cited herein are expressly incorporated by reference.

What is claimed is:

1. A device for the connection of a duct, comprising:
at least one tubular body and one tubular sealing sleeve, the tubular body being provided internally with an axial stop for the tubular sealing sleeve, the tubular sealing sleeve being mounted coaxially with the tubular body so as to define a tubular accommodating housing for the duct, the sealing sleeve having an end which delimits an annular inlet to the housing and said end being radially deformable elastically between a rest state in which the annular inlet has an inside diameter greater than the inside diameter of the duct and a deformed state in which the inside diameter of the annular inlet is such that it allows the duct to be introduced into the housing,
wherein said housing comprises:
a maintaining member for maintaining said end of the sealing sleeve in its deformed state,
wherein said member is configured to be movable between an active position in which it maintains said end in the deformed state and an inactive position in which it is carried by the duct during the introduction thereof and allows said end to return to its rest state, the tubular accommodating housing being defined by an external surface of the sealing sleeve and an opposite internal wall of the tubular body, and
wherein the device further comprises:
at least one elastic return member for returning the maintaining member to its active position.

2. The device of claim 1 wherein the stop of the tubular body has a frustoconical surface that has a small diameter by the sealing sleeve.

3. The device of claim 1 wherein the maintaining member comprises a ring surrounding one end of the sealing sleeve.

4. The device of claim 3 wherein the inner surface of the ring surrounding one end of the sealing sleeve comprises axial ribs.

5. The device of claim 1 wherein the elastic return member comprises a helical spring surrounding the sealing sleeve.

6. The device of claim 1 wherein the elastic return member comprises a ring which is in one piece with the maintaining member and which is provided with a helical crossing groove.

7. The device of claim 1 having at least a supplementary tubular body in fluidic communication with the tubular body.

8. The device of claim 1, wherein when said end of the sealing sleeve is in the deformed state an outer diameter of said end is less than when said end is in the rest state.

9. The device of claim 1, wherein when said end of the sealing sleeve is in the deformed state an outer diameter of said end is less than or equal to an inner diameter of the duct to allow the duct into the housing.

10. The device of claim 1, wherein said tubular accommodating housing is a cavity that is able to receive the duct.

11. A device for the connection of a duct, comprising:
at least one tubular body and one tubular sealing sleeve, the tubular body being provided internally with an axial stop for the tubular sealing sleeve, the tubular sealing sleeve being mounted coaxially with the tubular body so as to define a tubular accommodating housing for the duct, the sealing sleeve having an end which delimits an annular inlet to the housing and said end being radially deformable elastically between a rest state in which the annular inlet has an inside diameter greater than the inside diameter of the duct and a deformed state in which the inside diameter of the annular inlet is such that it allows the duct to be introduced into the housing,
wherein when said end of the sealing sleeve is in the rest state an outer diameter of said end is greater than an inner diameter of the duct such that the duct would not be allowed into the housing, and
wherein said housing comprises:
a maintaining member for maintaining said end of the sealing sleeve in its deformed state,
wherein said member is configured to be movable between an active position in which it maintains said end in the deformed state and an inactive position in which it is carried by the duct during the introduction thereof and allows said end to return to its rest state, the tubular accommodating housing being defined by an external surface of the sealing sleeve and an opposite internal wall of the tubular body.

12. A device for the connection of a duct, comprising:
at least one tubular body and one tubular sealing sleeve, the tubular body being provided internally with an axial stop for the tubular sealing sleeve, the tubular sealing sleeve being mounted coaxially with the tubular body so as to define a tubular accommodating housing for the duct, the sealing sleeve having an end which delimits an annular inlet to the housing and said end being radially deformable elastically between a rest state in which the annular inlet has an inside diameter greater than the inside diameter of the duct and a deformed state in which the inside diameter of the annular inlet is such that it allows the duct to be introduced into the housing, wherein said housing comprises:
  a maintaining member for maintaining said end of the sealing sleeve in its deformed state,
  wherein said member is configured to be movable between an active position in which it maintains said end in the deformed state and an inactive position in which it is carried by the duct during the introduction thereof and allows said end to return to its rest state, the tubular accommodating housing being defined by an external surface of the sealing sleeve and an opposite internal wall of the tubular body, and
  wherein said maintaining member is arranged in the tubular accommodating housing and has a radially inwardly facing surface that maintains said end of the sealing sleeve in the deformed position by urging said external surface of the sealing sleeve radially inward when the maintaining member is in the active position.

* * * * *